A. F. JOBKE.
FOCUSING DEVICE.
APPLICATION FILED AUG. 11, 1920.

1,399,347.

Patented Dec. 6, 1921.

INVENTOR:
August F. Jobke

UNITED STATES PATENT OFFICE.

AUGUST F. JOBKE, OF PITTSBURGH, PENNSYLVANIA.

FOCUSING DEVICE.

1,399,347.   Specification of Letters Patent.   Patented Dec. 6, 1921.

Application filed August 11, 1920. Serial No. 402,862.

*To all whom it may concern:*

Be it known that I, AUGUST F. JOBKE, a citizen of the United States, residing at Pittsburgh, in the county of Allegheny and State of Pennsylvania, have invented a new and useful Focusing Device, of which the following is a specification.

My invention relates to a focusing device, the object of which is to automatically keep a photographic lens, a plane surface corresponding to an object to be projected and a plane surface corresponding to a screen or projecting surface in such positions relative to one another, that the image produced through the lens is sharp at any ratio of magnification as well as reduction.

Another object of this invention, is to make it adjustable to such an extent as to render it applicable not only to the use of a single lens of a certain focal length, but to the focal length of any other lens chosen, thus giving it a usefulness highly desirable in all kinds of reproduction, and facilitating its manufacture.

Being based on a simple geometric configuration, this invention permits an exact adjustment of its several elements, and therefore the most accurate results can be obtained through its application.

I attain these objects by applying a mechanism, the principal part of which is a right angle lever, or for certain purposes an equivalent of the same, and I use the angular position of the right angle lever relative to the optical axis of the combination to establish both conjugate focal distances.

The nature of my invention will be more fully disclosed and made understood in the following description, where reference is had to the drawing in which.

Figure 1:
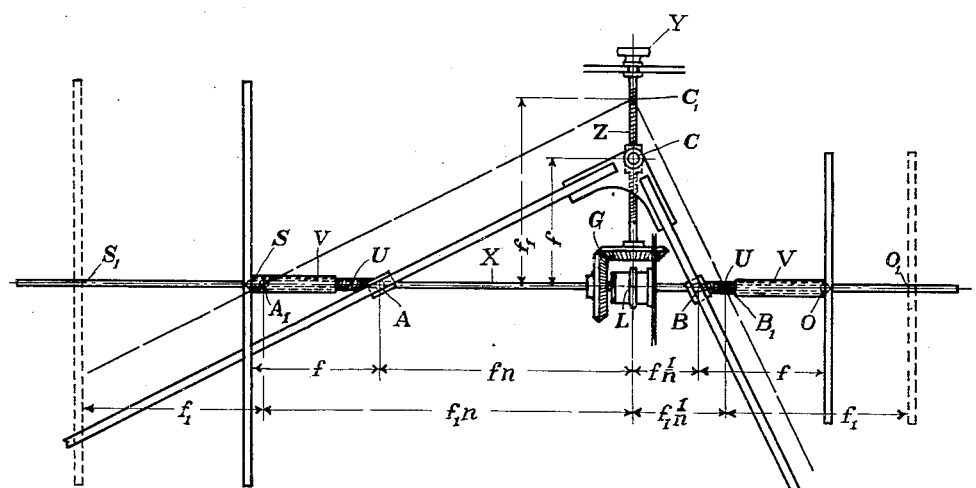
Figure 1 shows in a diagrammatic manner the different parts which constitute a projection-arrangement with the focusing device and the arrangement to change it for different focal lengths.

Owing to the varied uses this invention may be put to in connection with lenses, I deem it reasonable to describe it only with reference to the elements, which are necessary for projection, not referring to any form of camera or projection-machine. As such, O in Fig. 1 denotes an object to be projected, L a lens used for producing an image thereof, and S a projection screen or sensitive surface to receive the projected image. A right angle lever ACB, having its fulcrum at C, stationary relative to the lens L and at a distance from a plane through the optical axis equal to the focal length of the lens, has on each arm a longitudinally sliding pivoted bearing, A and B respectively, which is adapted to slide also on a line parallel to the optical axis in the plane referred to. Connecting links AS and BO respectively, the length of which is equal to the focal length of the lens, connect the object O and screen S to the sliding bearings on the lever arms.

Any angular change of the right angle lever relative to the optical axis will change the positions of O and S in such a manner that their distances from the lens are conjugate focal distances representing a distinct ratio of projection, which is magnification, if SL is the major conjugate focal distance and reduction in the opposite case. When ACB is an equilateral triangle, then AL−LB=the focal length of the lens and S and O are located two focal lengths from L; this condition corresponds to projection or reproduction in the same size.

Geometrically the action of the lever is readily understood, if we consider the rectangular triangle ACB, in which AB is the hypotenuse. CL is then normal to the same, and the middle proportionate between the two sections of the hypotenuse, AL and LB. In other words, the two sections are reciprocals of each other relative to the focal length and are termed the extra-focal distances. Since the dimension of the major conjugate focus$=f(n+1)$ and the minor conjugate focus $=f\left(\frac{1}{n}+1\right)$, where $f=$ the focal length of the lens and $n=$ the factor of magnification or its reciprocal for reduction, we can readily see that the first members in both brackets are determined by the position of the right angle lever, while the second members are provided by the connecting links SA and BO.

While these connecting links may be connected with one arm each of the lever, which would place the fulcrum C in a plane through the optical center of the lens normal to its axis, they may be replaced by links, the sum or difference of which is equal to two focal lengths, or by one link of the same total dimension, either at A or B.

If the arms of the right angle lever are of equal length, sufficiently long to provide for the major conjugate focal length on either side of the lens at a maximum ratio of projection, the combination is adapted to enlarge or reduce at this ratio, i. e., for a factor of $n$ the total range is $n^2$.

In many cases, particularly for commercial purposes, where only enlargement or reduction is intended, the lever can be modified so that the lever arm, adjusting the minor conjugate focus, is provided to be of shorter length, since it has to move the object within the distance of one focal length. With a reproduction of full size, its dimension from the fulcrum C to the center of the sliding bearing (A or) B is equal to 1.414 focal lengths of a lens of longest focus.

Discussing now the adjustability of the focusing device to the requirements of lenses of different focal lengths, reference may be had to Fig. 1, where $C_1$ may be the location of the fulcrum of the lever corresponding to a focal length $f_1$ of a lens at L. For the same ratio of reduction we have a triangle $A_1C_1B_1$, which is similar to ABC. $A_1$ and $B_1$ are the new locations of the sliding bearings. The ratio of $A_1L$ and $LB_1$ remains therefore the same, but the planes S and O require relocation to obtain the lengths $f_1$ for the connecting links $S_1A_1$ and $B_1O_1$.

Obviously the fulcrum C will have to be varied along the normal CL when a connecting link $=f$ is provided at each arm of the lever, to keep the conjugate focal lengths in the same proportions, as Fig. 1 demonstrates. The angle between CL and AB varies between 90° and 45° for a corresponding decrease from a focal length of the connecting link on the same side. An angle of 45° will then correspond to the length of the coördinate link being equal to zero, while the opposite link will be equal to two focal lengths.

The links SA and BO may be adjusted simultaneously with the location of the fulcrum C. As an example of the means applicable a screw Z is shown, which may be turned by means of the knurled head Y, and by means of a nut moves the pivot C up or down as required. A miter-gear set G transmits the movement of the screw to the shaft X which must be long enough to reach into sleeves U which are parts of the links SA and BO. In keying the shaft X and the sleeves loosely, angular movement between them is prevented and only axial sliding made possible.

Figure 2:
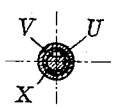
Fig. 2 shows a section through an adjustable connecting link.

External thread on the sleeves U and internal thread on the second members V of the connecting links of the same pitch as that of the screw Z places the planes S and O in the right focal planes relative to the fulcrum C. It has to be kept in mind, that, if Z and BO have right hand thread, the thread on SA must be left hand. Fig. 2 shows a section through a connecting link.

The extrafocal distances and conjugate focal lengths are shown as multiples of the respective focal lengths for the convenience of inspection, assuming the connecting links are equal to one focal length.

Having thus described my invention, what I claim and desire to secure by Letters Patent is:—

1. In a focusing device a lens and a right angle lever, having its fulcrum at the right angle, stationary relative to the lens in the direction of its axis, variable relative to and located from a plane through the optical axis at a distance of the focal length, the arms of the lever at the intersection with the said plane on a parallel to the optical axis cutting at extra-focal distances for the focal length from the intersection of a normal from the fulcrum to the said parallel.

2. In a focusing device a lens and a right angle lever having its fulcrum at the right angle, stationary relative to the lens in the direction of its axis, variable relative to and located from a plane through the optical axis at a focal length, and a pivoted bearing on each arm of the lever adapted to slide on the arm and on a parallel to the optical axis in the said plane.

3. In a focusing device for an optical combination, consisting of an object, a lens and a plane representing a projecting surface, a right angle lever, having its fulcrum at the right angle, stationary relative to the lens in the direction of its axis, variable relative to and located from a plane through the optical axis at a focal length, a pivoted sliding bearing on each arm of the lever, adapted to slide on a parallel to the optical axis in the said plane, and means adapted to connect the object and projecting surface with the sliding bearings, so that the distance between them is equal to the two conjugate focal lengths.

4. In a focusing device for an optical combination, consisting of an object, a lens and a plane representing a projecting surface, a right angle lever, having its fulcrum at the right angle, stationary relative to a lens in the direction of its axis, variable relative to and located from a plane through the optical axis at a focal length, a pivoted sliding bearing on each arm of the lever, adapted to slide on a parallel to the optical axis in the said plane, means adapted to connect the object and projecting surface with the sliding bearings, and means to vary the position of the fulcrum relative to the said plane through the optical axis.

5. In a focusing device for an optical combination, consisting of an object, a lens and a plane representing a projecting surface, a right angle lever having its fulcrum at the right angle, a pivoted sliding bearing on each arm of the lever, adapted to slide on a parallel to the optical axis, means to vary the position of the fulcrum, including a nut supporting the latter and a screw along a line in a plane through the optical center of the lens at an angle to the optical axis, and means, including adjustable connecting links, adapted to connect the object and projecting surface with the sliding bearings, their length being equal to two focal lengths.

6. In a focusing device for an optical combination, consisting of an object, a lens and a plane representing a projecting surface, a right angle lever, having its fulcrum at the right angle, a pivoted sliding bearing on each arm of the lever, adapted to slide on a parallel to the optical axis, means to vary the position of the fulcrum, including a nut supporting the latter and a screw, adapted to be guided on a line normal to the optical axis, and means, including adjustable connecting links of one focal length each, to connect the object and projecting surface to the sliding bearings to establish conjugate focal lengths between the object, the lens and the projecting surface.

In testimony whereof I affix my signature.

AUGUST F. JOBKE.